Sept. 18, 1928.

H. W. HOUCK 1,684,703

ARRANGEMENT OF ELECTRICAL APPLIANCES

Filed Oct. 24, 1924   3 Sheets-Sheet 1

INVENTOR
HARRY W. HOUCK
BY
H. C. Van Deventer
ATTORNEY

Sept. 18, 1928.                                                1,684,703
H. W. HOUCK
ARRANGEMENT OF ELECTRICAL APPLIANCES
Filed Oct. 24, 1924        3 Sheets-Sheet 2
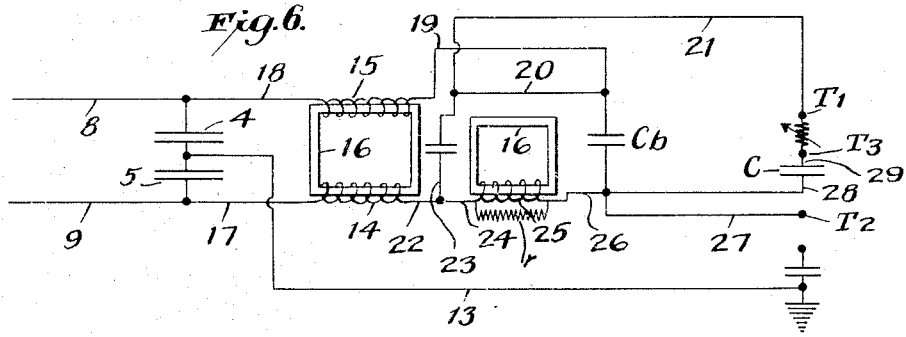
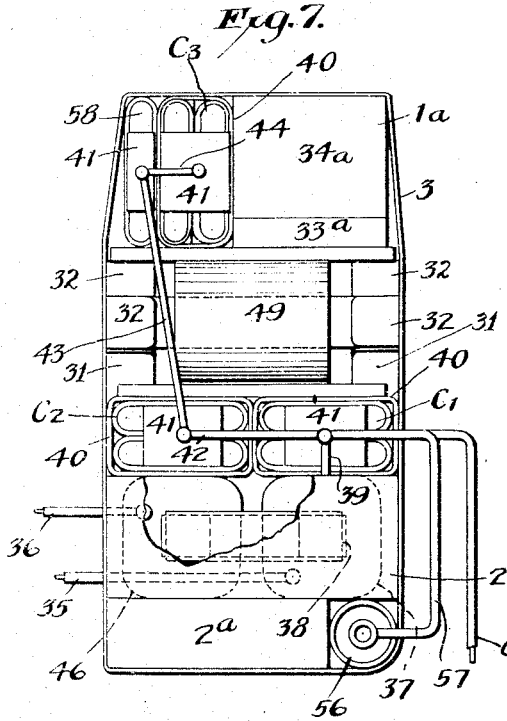
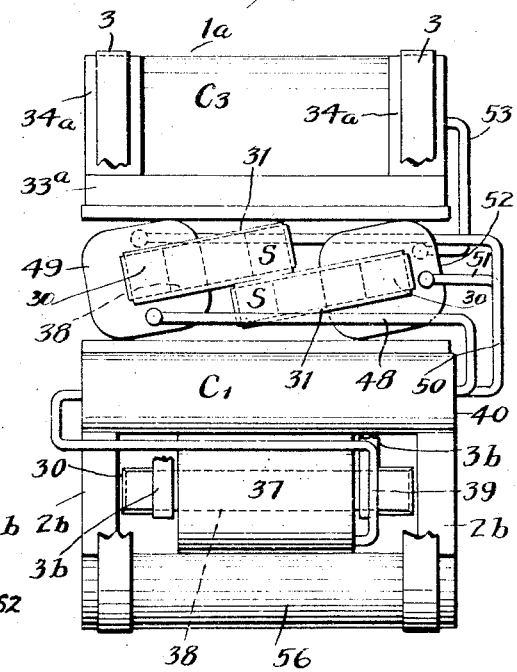
INVENTOR
HARRY W. HOUCK
BY
ATTORNEY Sept. 18, 1928.
H. W. HOUCK
ARRANGEMENT OF ELECTRICAL APPLIANCES
Filed Oct. 24, 1924   3 Sheets-Sheet 3
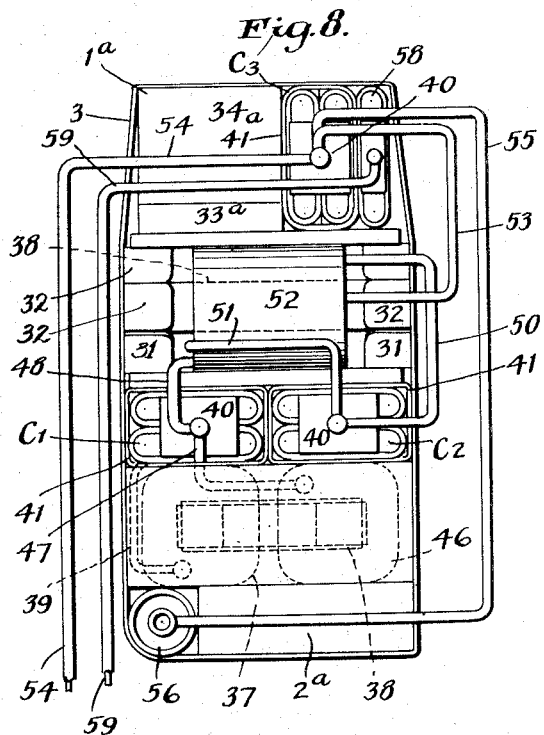
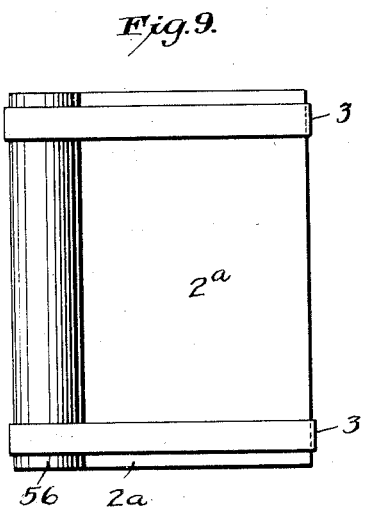
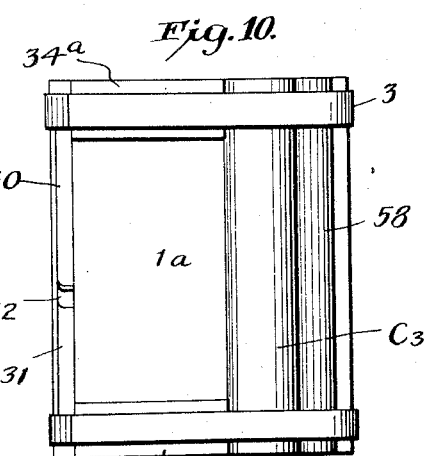
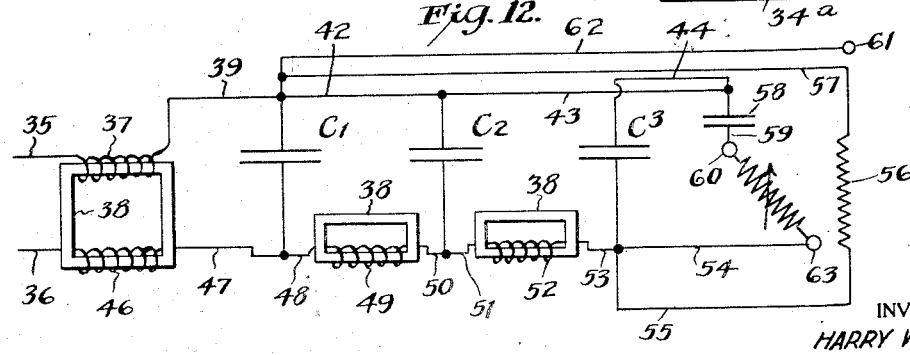
INVENTOR
HARRY W. HOUCK
BY
ATTORNEY Patented Sept. 18, 1928.

1,684,703

UNITED STATES PATENT OFFICE.

HARRY W. HOUCK, OF EAST ORANGE, NEW JERSEY, ASSIGNOR, BY MESNE ASSIGNMENTS, TO DUBILIER CONDENSER CORPORATION, OF NEW YORK, N. Y., A CORPORATION OF DELAWARE.

ARRANGEMENT OF ELECTRICAL APPLIANCES.

Application filed October 24, 1924. Serial No. 745,660.

This invention relates to improvements in arrangements of electrical appliances; particularly stacks of electrical appliances secured together in a group or bundle to make a structural unit.

An object of the invention is to provide a stack of electrical appliances or members which are bound together in compact form, for the purpose of enabling them to be conveniently manipulated, as when the appliances are to be mounted in a container or casing or removed therefrom.

A further object of the invention is to provide a stack of the kind mentioned with the electrical appliances constituting the stack held together in the form of a bundle and with the separate appliances united by conductors to one another in the proper relations; connections being included for certain of said appliances such that the entire group of electrical appliances in the stack can be united to the circuit or circuits with which the appliances are to operate.

Another object of the invention is to provide a filter device or stack of electrical appliances embracing a number of choking coils so arranged that the coils have no detrimental inductive effect upon one another; with the result that when the stack, with the appliances united in the proper electrical relations, is joined to a radio receiving set for instance, no hum or other disturbing noise can be perceived in the telephones.

These and other objects and advantages of the invention will be apparent from the following description taken with the accompanying drawings, which show several modes in which the invention may be practiced; and the characteristics of the invention are defined in the appended claims. The disclosure, however, is illustrative only and changes may be made without regard to details of shape, size and arrangement of parts, without departing from the nature and scope of the invention as indicated by the broad and general meanings of the terms in which the claims are expressed.

On the drawings, Figure 1 is a side elevation of a stack of electrical appliances according to my invention.

Fig. 6 is a view showing the manner in which the various appliances are electrically connected.

Fig. 7 is a side view of another form of stack according to my invention.

Fig. 8 is an opposite side view thereof.

Figs. 9 and 10 are opposite end views of the same; Fig. 9 being a bottom and Fig. 10 a top view, with reference to Fig. 8; no connecting wires appearing.

Fig. 11 is a front view seen from the right of Fig. 7; and,

Fig. 12 is a diagram of the circuit connections for the electrical appliances of the stack presented in Figs. 7 to 10 inclusive.

On the drawings, the same numerals identify the same parts throughout.

Figure 1:
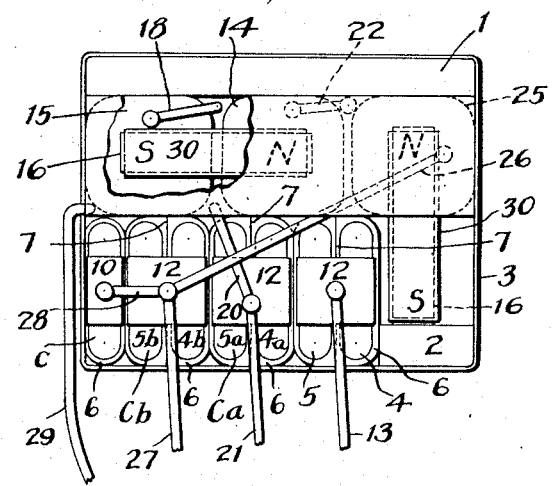

In the particular description of the drawings reference is had first to the structure shown in Figs. 1 to 6 inclusive. In these views the stack appears as embracing a plurality of electrical condensers 4, 5, $C^a$, $C^b$ and $c$ disposed side by side, together with three coils 14, 15 and 25, also placed side by side above the row of condensers; the stack being covered by a U-shaped cap 1 which is laid on the top of the coils and extends down over the opposite ends of the same; a block of wood or other material 2 being directly beneath the coil 25 and abutting the outside of the core thereof so as to make the sides of the stack approximately rectangular; bands 3 encircling the stack and passing across the tops and ends adjacent each side to hold the stack together with the electrical appliances constituting it in the form of a compact bundle. The condensers 4 and 5 are enclosed in a single casing which may be in the form of a flat cardboard or paper cover 6 open at its ends, with a central partition in the cover of cardboard or fibre 7 separating one of these condensers from the other. The condensers $C^a$ and $C^b$ which are placed beside the condensers 4 and 5 may also be enclosed in cardboard covers 6 open at their ends and each of these condensers may consist of two sections, $4^a$ and $5^a$ and $4^b$ and $5^b$ respectively; the two being separated by partition 7 as before. The condenser $c$ at the end of the row is smaller and consists of but a single section. An additional band 3ª passing beneath the cap 1 may also be employed.

Figure 3:
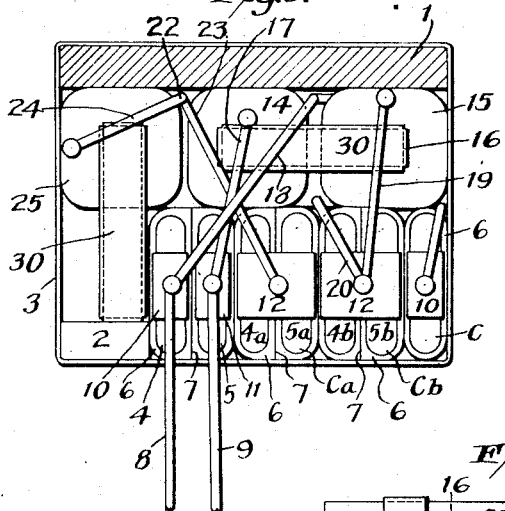
Fig. 3 is an opposite side elevation thereof; the cap being in section to reveal the parts of the stack.
Figure 5:
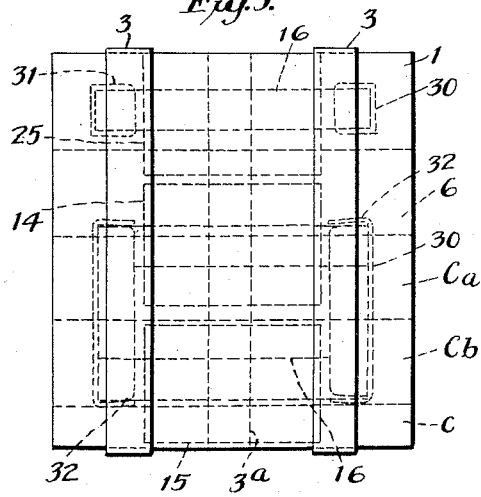
Fig. 5 is a top plan thereof.
Figure 4:
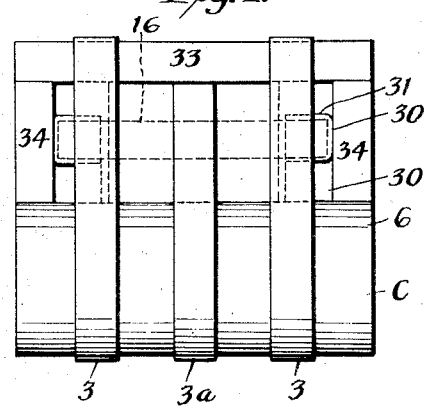
Fig. 4 is an opposite end view thereof; also without connecting wires.

The numerals 8 and 9 indicate the conductors, one of which leads to the condenser 4 and the other to the condenser 5. Part of the electrical sheets or plates of each of the two condensers 4 and 5 project at one end, for example, the end indicated on Fig. 3, and are joined together by being soldered to a plate indicated at 10, in the case of condenser 4, and 11 in the case of condenser 5. To the terminal 10 of the condenser 4 and the terminal 11 of the condenser 5, the conductors 8 and 9 are respectively united for example, by soldering them fast at their ends which are shown in Fig. 3. The remaining electrically conductive plates or sheets of the two condensers 4 and 5 are caused to project at the opposite ends and are united together by a band or plate 12 to which is affixed the extremity of a conductor 13. As indicated in Fig. 6, the condensers 4 and 5 are in series with each other and bridged across the conductors 8 and 9 with the conductor 13 serving as a tap which leads off from between these two condensers.

From the condensers 4 and 5 extend connections to the coils 14, 15, 25 and the condensers. The coils 14 and 15 are placed upon opposite sides of the same closed core 16; the plane of this core being horizontal with the coils 14 and 15 resting upon their sides on the tops of the casings 6 of the row of condensers. The outer side of the coil 15 is flush with the side of the casing 6 of the condenser $c$, but the outer side of the coil 25 is somewhat beyond the vertical plane of the side of the casing 6 of the condenser 4 at the opposite end of the row of condensers; and the plane of the core 16ª, which is also closed, is vertical and extends downward making contact with the adjacent side of the casing 6 of the condenser 4 and abutting the block 2. From the terminal of the condenser 4 to which the conductor 8 is joined leads a conductor 18 to one extremity of the coil 15 and the other extremity of the coil is joined by a conductor 19 to one terminal of the condenser $C^b$. See Fig. 3.

At 20 is indicated a connector which joins the same terminal of the condenser $C^b$ to one terminal of the condenser $C^a$. As shown in both Fig. 1 and Fig. 3 the sections of the two condensers $C^a$ and $C^b$ are so arranged that part of their conductive plates extend out at one end and part extend out at the other; the sheets or plates being united by conductive plates 12 at each end, so that the sections $4^b$ and $5^b$ are in parallel with each other and making, in effect, a single condenser.

The lead 19 is secured to the plate or terminal 12 of the condenser $C^b$ and the connection 20 runs therefrom to one of the similar terminals of the condenser $C^a$. From the same terminal of the condenser $C^a$ extends a conductor 21. Also from the terminal plate 11 of the condenser 5 runs a conductor 17 to one extremity of the coil 14 on the opposite side of the core 16 and from the opposite extremity of this coil 14 runs a lead 22 which branches at 23 to unite with the terminal of the condenser $C^a$ opposite to the terminal to which the leads 20 and 21 are connected. Further from the conductor 22 extends another branch lead 24 which runs to one terminal of the coil 25, the opposite extremity of this coil being joined by an electrical connector 26 to the terminal plate 12 of the condenser $C^b$ opposite the end to which the connectors 19 and 20 are joined. The connector 26 also continues through a lead 27; and to the adjacent terminal of the condenser $C^b$ may be united a short lead 28 which runs to one terminal of the smaller condenser $c$, the other terminal of which is provided with a lead 29.

The scheme of connections is made clear in Fig. 6, the intent being that the conductor 21 be led to a terminal $T_1$, the conductor 27 to a terminal $T_2$, the conductor 29 to a terminal $T_3$ and the lead 13 to a ground connection.

The manner in which this circuit operates and the electrical connections of the various appliances, except as hereinafter stated, are not a part of this invention but are described and specified in the claims of the application Serial No. 745,659 of Harry W. Houck for a patent upon improvements in filtering apparatus for direct current, filed the 24th day of October, 1924. It is sufficient to state here that the object of this circuit is to remove fluctuations from direct current, such as is employed in the lighting or power system of a house or building, and supply it for example, to the plate or anode circuits of a radio receiving set, the choking coils and condensers eliminating the ordinary ripples or fluctuations and the ground connection 13 the larger fluctuations; while the terminals $T_1$, $T_2$ and $T_3$ are the usual terminals of a radio receiving set to which this circuit is to be connected. Obviously, the circuit shown in Fig. 6 is the same as it would be if the conductors 19 and 21 were omitted and the conductor 20, besides being joined to the ends of the condensers $C^a$ and $C^b$ were also united directly to the adjacent terminal of the coil 15 at one end and to terminal $T_1$ on the other. The method of connection shown is for convenience in disposing the various conductors along the sides of the stack. In this application the invention set forth does not reside merely in the construction of the stack of terminals $T_1$, $T_2$ and $T_3$ leading to the work or output circuit either, but relates to the particular arrangement whereby mutual induction (which would cause humming noises in the receiving set), between certain of the parts of the stack is prevented.

Figure 2:
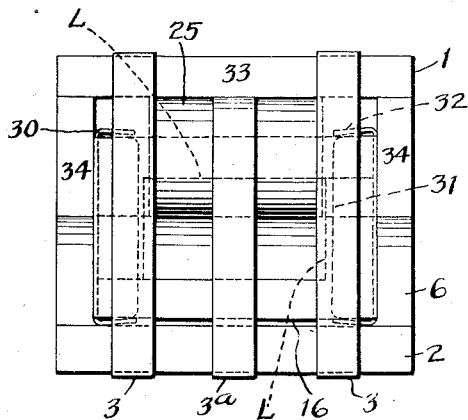
Fig. 2 is an end view of what is shown in Fig. 1 seen from the right; all connecting wires being omitted.

To assemble the cores 16 and 16ª of the coils 14, 15 and 25, L-shaped laminations or sections indicated by the letter "L" in Fig. 2 are selected and joined by disposing the end of the base of one L against the side of the top of the other L; clips 30 having up-turned sides 31 and over-turned ends 32 engaging the ends of the core so as to hold the sections together and cover the joints.

Further, the cap 1 may be U-shaped and inverted, consisting of a base 33 and sides 34, the base resting upon the tops of the coils 14, 15 and 25 and the two sides extending down over the ends of the cores 16 and $16^a$ and resting upon the upper sides of the casings 6 of the condensers and flush with their ends. The bands 3 girdle the cap and condensers and hold the parts of the stack firmly together so that it can be inserted into a casing and the connections made by uniting the leads 8, 9, 13, 21, 27 and 29 to the required points.

It is desirable that the coils 14, 15 and 25 be so wound as to insure that one has no detrimental inductive effect upon the other. The coils 14 and 15 upon the one core 16 are so wound that one reinforces the other. That is, the effect of these coils is such that the direction of the magnetic force due to each of them is the same around the circuit of the core 16. Further the direction of the magnetic force in the top of the core $16^a$ of the coil 25 must be in the same direction as the direction of the magnetic force in the adjacent side of the core 16 of the first two coils. Thus the adjacent sides of the two cores 16 and $16^a$, such as the right side of the core 16 for the coils 14 and 15 and the top of the core $16^a$ for the coil 25 in Fig. 1 develop like poles at the ends which are towards the observer in Fig. 1, and the same is true of the opposite end of the same side of core $16^a$ of coil 25 and the opposite end of the adjacent side of the core of the coils 14 and 15. Then there is no detrimental leakage of magnetic lines of force from either core over to the other and no detrimental inductive effect upon either of the coils 14 and 25 because the leakage or field from one coil reacts upon the other coil in such manner as to neutralize its effect.

With this arrangement of the direction of the windings of coils 14, 15 and 25, the fluctuations which may occur in the direct current supplied to the leads 8 and 9 are effectively smoothed out and the current is without pulsations when it reaches the terminals $T_1$, $T_2$, $T_3$; and further no disturbance is produced by the coils 14 and 25. The humming sound which would be heard in the telephones of the receiving set if the coils 14, 15 and 25 were inductively related to one another is eliminated and rendered imperceptible.

The stack described in the foregoing with appliances such as coils and condensers is designed for connection with a direct current circuit to be joined to the terminals of the leads 8 and 9.

In Figs. 7 to 12 inclusive there is illustrated a stack, the parts of which are intended for connection with an alternating current circuit after the alternating current has been rectified and converted into a pulsating current in one direction; this stack containing similar appliances in the form of coils and condensers for filtering the pulsating current and smoothing it out, so to speak, by eliminating the fluctuations and rendering it continuous; so that when utilized for the plate or anode circuits of a radio receiving set the current has become steady current without inductive effects or humming or other objectionable noises being apparent in the telephones.

The stack of Figs. 7 to 12 inclusive comprises for the most part a pair of coils 37 and 46 adjacent the end shown as the lower end; two condensers $C_3$ and 58 adjacent the opposite end; with condensers $C_1$ and $C_2$ placed side by side and resting upon the coils 37 and 46 respectively; and a pair of additional coils 49 and 52 between these condensers $C_1$ and $C_2$ and the condensers $C_3$ and 58 at the top. At the bottom of the stack is a member $2^a$ forming a cap of the same shape as the cap 1 to cover the sides and ends of the two lower coils 37 and 46; while at the top of the stack is a U-shaped frame $1^a$, consisting of a base $33^a$ and upright sides $34^a$, which is placed outside the condensers $C_3$ and 58 so as to make the stack approximately rectangular on the sides and enable the bands 3 to encircle the cap over the coils 37 and 46 at the bottom, the condensers $C_1$ and $C_2$, the coils 49 and 52 and the condensers and upright sides $34^a$ of the frame $1^a$ at the top, securely.

The two coils 37 and 46 on the lower end of the stack are side by side and parallel to each other and the coil 37 has one extremity joined to a supply lead 35 while the one extremity of the other coil 46 has one extremity joined to a supply lead 36. The two coils have a single closed core 38 in common; this core as before made up of L-shaped laminations or in any other suitable manner. These two coils with their core thus being united in structure are placed within the cap or seat $2^a$ and between its sides $2^b$. The lead 35 running to one terminal of the coil 37 as stated, the other terminal of this coil is joined by a lead 39 to one terminal of the condenser $C_1$. The condensers $C_1$, $C_2$ and $C_3$ may be enclosed in casings or sleeves 40 and the conductive elements of each condenser may project part from one end and part from the other and be joined to terminal plates 41. From the terminal of the condenser $C_1$ to which the lead 39 is connected runs a lead 42, to a terminal of the condenser $C_2$, and from the same terminal of this condenser $C_2$ another lead 43 extends to a terminal of the condenser 58, this lead continuing through another connector 44, to the adjacent terminal of the condenser $C_3$. On the opposite side of the supply circuit the lead 36 runs to one terminal or extremity of the coil 46, the other extremity of which has a connection 47 running to the other terminal of the condenser $C_1$. From the lead 47 and adjacent that terminal of the condenser $C_1$ runs another connector 48 to one terminal of the coil 49, the opposite extremity of this coil having a connection 50 to the other terminal of the condenser $C_2$ and the connection 51 runs from the other terminal of this condenser to one terminal of the coil 52; the other terminal of this coil 52 being joined by a lead 53 to the other terminal of the condenser $C_3$; this other terminal of the condenser $C_3$ also being united to a lead 54 and a second or branch lead 55. The lead 55 runs to a fixed resistance element 56 parallel with the axis of the coil 37 and beneath this coil, the base of the seat $2^a$ being reduced so that the sides $2^b$ of the seat project beyond the base and permit the ends of the element 56 to rest against the lower edges of the sides $2^b$. This element 56, too, may be enclosed in a cardboard or fibre cover or casing and the other extremity of this element 56 is joined by a lead 57 to the terminal of the condenser $C_1$ to which the lead 39 is affixed. One terminal of the condenser 58 being in circuit with the lead 43, the other pole or terminal is joined by a conductor 59 to a terminal 60. United to the conductor 57 is a terminal 61 by a lead 62, and the conductor 54 leading from the adjacent extremities of the coil 52 and condenser $C_3$ runs a third terminal 63. These terminals, like the terminals $T_1$, $T_2$ and $T_3$ above, will enable connections to be made between the output terminals of the stack and the input terminal of a radio receiving set.

The diagram of circuit connections is shown clearly in Fig. 12 but as in the case of the stack described above in connection with Figs. 1 to 5 inclusive, the arrangement of the electrical appliances in the circuit is not a part of the invention which is described herein and recited in the claims; neither does the invention of this application reside in the manner of making up the stack so that it forms a unit, but rather in the means for preventing the choke coils from having detrimental inductive effects on one another, as above set forth in connection with Figures 1 to 6 inclusive.

As indicated in Fig. 11, the coils 49 and 52 must be wound in such a way that one will have no inductive effect upon the other, that is to say, with the cores 38 of these two coils overlapping each other as shown in Fig. 11, the direction of the flux through the two parallel overlapping portions must be the same, thereby developing like poles at adjacent ends. Otherwise, when the stack made up in this way is connected to a radio receiving set a hum corresponding to the frequency of the alternating current, which is rectified and then passed through the electrical appliances of the stack, could be heard. But with the magnetic circuits controlled as indicated, the hum is entirely neutralized.

In order to make the binding of the stack more secure, additional bands $3^b$ may be employed to go around the condensers $C_3$ and 58 and the sides $34^a$ of the frame $1^a$ on the top and between the sides $2^b$ of the seat $2^a$ and around the ends of the core of the two coils 37 and 46.

Clips 30, as above, may be attached to the laminated sections of the cores to hold the cores together.

This stack for use with the rectified current from an alternating circuit connected to the leads 35 and 36 will also serve very efficiently to smooth out the pulsations and make the current steady and continuous without fluctuations of any kind, so that a radio receiving set when joined to the terminals 60, 61 and 63 will operate without humming or other objectionable noises interfering with the reception.

Of course the circuits shown in Figures 6 to 12 are intended only as single illustrations of the manner in which the various electrical appliances can be joined to one another, as the various connections may be changed at will so long as the electrical effect or result is the same.

The cores 16 and $16^a$ and 38 may be closed or nearly closed, as desired.

An impedance in multiple with one of the coils 14, 15 and 25, for example, coil 25, is shown at $r$ in Figure 6, to improve the filtering and prevent oscillations at the frequency of the free or natural period of the circuit. When this resistance $r$ is present, it may be included in the stack shown in Figures 1, 2, 3, 4 and 5.

Having described my invention, what I believe to be new and desire to secure and protect by Letters Patent of the United States is:—

1. In a device of the character described having a source of varying current connected thereto, a plurality of inductance coils having magnetic cores, said cores being located adjacent each other in close physical relation, the inductance coils being connected with said source of current, and the windings of the coils being connected in such manner that like magnetic poles are induced in adjacent ends of the magnetic cores, whereby detrimental magnetic coupling effects between the coils are substantially reduced.

2. A device adapted to smooth out fluctuations in an electric current, a source of varying power connected thereto, the device including a plurality of choke coils having magnetic cores, said cores being located adjacent each other in close physical relation, the choke coils being connected in circuit relation with said source of power, the windings of the coils being connected in such manner as to induce like magnetic poles in the adjacent ends of the magnetic cores, whereby detrimental coupling effects between the coils are substantially eliminated.

3. A device adapted to smooth out the disturbances in a source of power connected thereto, the device including a plurality of choke coils having magnetic cores, the said cores being arranged so that both of the magnetic poles of each of the coils are in close physical relation with the magnetic poles of an adjacent coil, the coils being wound in such manner as to induce like polarities in the said magnetic poles which are in close physical relation, whereby detrimental coupling effects between the coils are substantially eliminated.

4. A device of the character described comprising electrical units in operative relation and including a plurality of inductance coils connected in circuit relation, said coils having rectangular cores with the magnetic axis of at least one of the coils at right angles to the magnetic axes of certain of the other coils, certain of the said cores of the latter coils having portions adjacent and parallel to portions of other of the cores of said latter coils, the latter coils being wound so as to produce like magnetic poles at adjacent ends of the said parallel portions, thereby preventing detrimental coupling effects between the coils.

5. A device adapted to smooth out disturbances in a source of power supply connected thereto, the device including a plurality of choke coils connected in circuit relation with the source of power, said coils having rectangular cores, the cores having adjacent and parallel portions in close physical relation to each other, the coils being wound in such direction as to produce like magnetic poles at adjacent ends of the said parallel portions, whereby detrimental coupling effects between the coils are eliminated.

Signed at New York, in the county of New York and State of New York, this 23rd day of October, A. D. 1924.

HARRY W. HOUCK.